US012654475B1

(12) United States Patent
Wu

(10) Patent No.: US 12,654,475 B1
(45) Date of Patent: Jun. 16, 2026

(54) PRINTER

(71) Applicant: Shenzhen Senortian Intelligent Co., Ltd, Shenzhen (CN)

(72) Inventor: Jiangyu Wu, Shenzhen (CN)

(73) Assignee: Shenzhen Senortian Intelligent Co., Ltd, Shenzhen City (CN)

( * ) Notice: Subject to any disclaimer, the term of this patent is extended or adjusted under 35 U.S.C. 154(b) by 0 days.

(21) Appl. No.: 19/277,243

(22) Filed: Jul. 22, 2025

(30) Foreign Application Priority Data

May 30, 2025 (CN) .......................... 202510719181.1

(51) Int. Cl.
| | |
|---|---|
| *B41J 11/66* | (2006.01) |
| *B23K 15/08* | (2006.01) |
| *B23K 26/03* | (2006.01) |
| *B23K 26/08* | (2014.01) |
| *B23K 26/16* | (2006.01) |
| *B23K 26/352* | (2014.01) |
| *B41J 2/01* | (2006.01) |
| *B41J 11/00* | (2006.01) |
| *B41J 13/08* | (2006.01) |

(52) U.S. Cl.
CPC .............. *B41J 11/66* (2013.01); *B23K 15/08* (2013.01); *B23K 26/03* (2013.01); *B23K 26/0838* (2013.01); *B23K 26/0869* (2013.01); *B23K 26/16* (2013.01); *B41J 2/01* (2013.01); *B41J 11/00214* (2021.01); *B41J 13/08* (2013.01); *B23K 26/3584* (2018.08)

(58) Field of Classification Search
CPC . B41J 11/70; B41J 11/66; B41J 11/663; B41J 11/703; B41J 11/706; B41J 2/01; B41J 11/00214; B41J 11/0015; B41J 13/08; B41J 15/04; B41J 11/0045; B41J 15/048; B41J 3/4075; B23K 15/08; B23K 26/03; B23K 26/0838; B23K 26/0869; B23K 26/16; B23K 26/3584
See application file for complete search history.

(56) References Cited

U.S. PATENT DOCUMENTS

| | | | |
|---|---|---|---|
| 2008/0239332 A1* | 10/2008 | Takada ................. | B41J 11/0015 |
| | | | 358/1.3 |
| 2017/0113476 A1* | 4/2017 | Hara ........................ | B41J 29/17 |
| 2022/0024230 A1* | 1/2022 | Suzuki ..................... | B41J 29/13 |
| 2024/0335906 A1* | 10/2024 | Echigo .................. | B23K 26/70 |

FOREIGN PATENT DOCUMENTS

CN        222116369  U        12/2024

* cited by examiner

*Primary Examiner* — Jannelle M Lebron

(57) ABSTRACT

A printer, including a conveying member, a printing member and a cutting member. The conveying member is configured to convey a printing substrate in a Y-axis direction. The printing member includes a first driving mechanism and a print head. The first driving mechanism is provided above the conveying member, and is configured to drive the print head in an X-axis direction. The print head is configured to perform printing on the printing substrate from above. The cutting member includes a second driving mechanism and a cutter. The second driving mechanism is provided above the conveying member, and is configured to drive the cutter in the X-axis direction. The cutter is configured to cut the printing substrate from above.

16 Claims, 7 Drawing Sheets

125
126
127

Z axis

X axis

Y axis

PRINTER

CROSS-REFERENCE TO RELATED APPLICATIONS

This application claims the benefit of priority from Chinese Patent Application No. 202510719181.1, filed on May 30, 2025. The content of the aforementioned application, including any intervening amendments made thereto, is incorporated herein by reference in its entirety.

TECHNICAL FIELD

This application relates to printing techniques, and more particularly to a printer.

BACKGROUND

Printers have been widely popularized in our daily life, and currently, there are many types of printers on the market, e.g., ultraviolet (UV) LED inkjet printers. The UV LED inkjet printer is a plate-free full-color digital printing machine, which is not limited by materials, and can perform printing on a wide range of materials, including flat, cylindrical or prismatic substrates made of acrylic, wood or metal. For example, printers can print the desired text and graphics onto a substrate to form the desired pattern, and an image cutting operation is often required after the printing operation is completed. In the conventional process, the cutting is manually carried out by an operator using a cutting tool, which leads to cumbersome operation and poor efficiency.

SUMMARY

An object of the disclosure is to provide a printer capable of automatically cutting a printing substrate.

Technical solutions of the present disclosure are described as follows.

A printer, comprising:

a conveying member;

a printing member; and a cutting member;

wherein the conveying member is configured to convey a printing substrate in a Y-axis direction;

the printing member comprises a first driving mechanism and a print head; the first driving mechanism is provided above the conveying member, and is configured to drive the print head to move in an X-axis direction; and the print head is provided above the conveying member, and is configured to be driven by the first driving mechanism to move to perform printing on the printing substrate; and the cutting member comprises a second driving mechanism and a cutter; the second driving mechanism is provided above the conveying member, and is configured to drive the cutter to move in the X-axis direction; and the cutter is provided above the conveying member, and is configured to be driven by the second driving mechanism to move to cut the printing substrate.

In some embodiments, the cutter is a laser.

In some embodiments, the laser has a power of greater than or equal to 8 W and less than or equal to 50 W.

In some embodiments, the laser is an engraving laser.

In some embodiments, the first driving mechanism and the second driving mechanism are configured such that the print head and the cutter move side by side in the X-axis direction; and the print head is in a shielded position in response to a case that the cutter performs cutting on the printing substrate.

In some embodiments, the printer further comprises a gantry frame;

wherein the gantry frame is provided above the conveying member; and the first driving mechanism and the second driving mechanism are mounted to the gantry frame.

In some embodiments, the printer further comprises a retaining frame;

wherein the retaining frame is configured to hold the printing substrate, and is detachably mounted on the conveying member; and the retaining frame is configured to be carried by the conveying member.

In some embodiments, the retaining frame is provided with a retaining portion having a mesh structure; and the retaining portion is configured to hold the printing substrate.

In some embodiments, the printer further comprises a module structure;

wherein the module structure comprises a base, a first transmission member, a second transmission member, a first guiding member, a second guiding member, a first driving motor and a second driving motor;

the first transmission member and the second transmission member are arranged side by side and in parallel on the base;

the first guiding member and the second guiding member are arranged side by side and in parallel on the base;

the first driving motor is provided on a first side of the base in a length direction of the base, and is connected to the first transmission member;

the second driving motor is provided on a second side of the base in the length direction of the base, and is connected to the second transmission member;

the first driving motor, the first transmission member and the first guiding member constitute the first driving mechanism; and the second driving motor, the second transmission member and the second guiding member constitute the second driving mechanism.

In some embodiments, the printer further comprises a third driving mechanism;

wherein the conveying member is mounted on the third driving mechanism; and the third driving mechanism is configured to drive the conveying member to move toward or away from the printing member and the cutting member in a Z-axis direction.

In some embodiments, the printing member further comprises a third driving mechanism;

the print head is mounted to the first driving mechanism;

the first driving mechanism is mounted to the third driving mechanism; and the third driving mechanism is configured to drive the first driving mechanism to move in a Z-axis direction, so as to drive the print head to move in the Z-axis direction.

In some embodiments, the cutting member further comprises a third driving mechanism;

the cutter is mounted to the second driving mechanism;

the second driving mechanism is mounted to the third driving mechanism; and the third driving mechanism is configured to drive the second driving mechanism to move in a Z-axis direction, so as to drive the cutter to move in the Z-axis direction.

In some embodiments, the printer further comprises a detection member;

wherein the detection member is provided above the conveying member, and is spaced apart from the printing member in the Y-axis direction; and the detection member comprises a camera, a scanner or a combination thereof.

In some embodiments, the printer further comprises a cleaning member;

wherein the cleaning member is configured to clean a surface of the printing substrate.

In some embodiments, the cleaning member comprises a cleaning brush, a vacuum dust collector or a combination thereof.

In some embodiments, the printing substrate is a plastic plate, a wooden plate or a metal plate.

Compared to the prior art, the present disclosure has the following beneficial effects.

The printer of the present disclosure is capable of automatically cutting the printing substrate.

Figure 1:
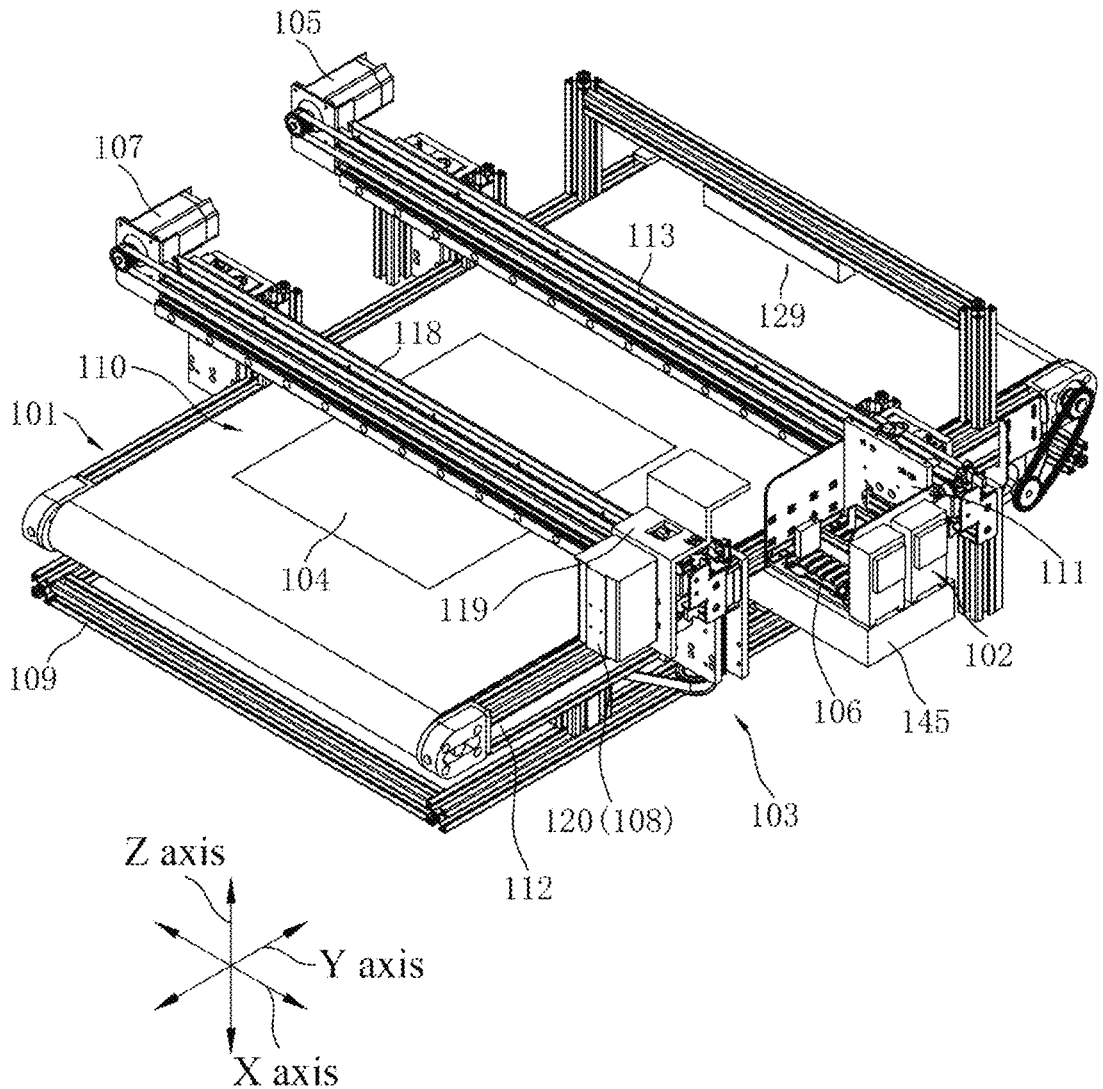
FIG. 1 is a top perspective view of a printer according to an embodiment of the present disclosure.

In the figures: 101—conveying member; 102—printing member; 103—cutting member; 104—substrate; 105—first driving mechanism; 106—print head; 107—second driving mechanism; 108—cutter; 109—machine base; 110—printing platform; 111—first mounting seat; 112—frame; 113—first gantry frame; 114—third driving mechanism; 115—first Z-axis driving motor; 116—first lead-screw transmission assembly; 117—first Z-axis guiding member; 118—second gantry frame; 119—second mounting seat; 120—laser; 121—fourth driving mechanism; 122—second Z-axis driving motor; 123—second lead-screw transmission assembly; 124—second Z-axis guiding member; 125—retaining frame; 126—retaining portion; 127—cavity; 128—third gantry frame; 129—detection member; 130—camera; 131—housing; 132—controller; 133—scanner; 134—cleaning member; 135—cleaning brush; 136—vacuum dust collector; 137—module structure; 138—base; 139—first transmission member; 140—second transmission member; 141—first guiding member; 142—second guiding member; 143—first driving motor; 144—second driving motor; and 145—ink pad.

DETAILED DESCRIPTION OF EMBODIMENTS

The embodiments of the present disclosure will be described in detail below with reference to the accompanying drawings, in which the same or similar reference numerals indicate the same or similar elements or elements having the same or similar functions throughout the drawings. The embodiments are merely exemplary and illustrative, and are not intended to limit the disclosure.

As used herein, the orientation or positional relationships terms, such as "up", "down", "front", "back", "left" and "right" are based on those shown in the accompanying drawings. These terms are solely for the convenience of describing the present disclosure in a simplified manner, and are not intended to indicate or imply that the devices or components must have specific orientations or be constructed and operated in such orientations. Therefore, these terms should not be understood as limitations of the present disclosure.

As used herein, the term "several" refers to one or more, and "multiple" refers to two or more. The terms "greater than", "less than" and "more than" are to be interpreted as excluding the stated value, while the terms "no more than", "no less than" and "within" are to be interpreted as including the stated value. As used herein, terms such as "first" and "second" are only descriptive, and should not be construed as indicating or implying their relative importance or implicitly specifying the number of technical features indicated. As a result, a feature defined as "first" or "second" may include one or more of such features, either explicitly or implicitly.

As used herein, unless otherwise explicitly specified, terms such as "provided", "mounted" and "connected" should be interpreted broadly. Those skilled in the art may reasonably determine the specific meanings of these terms in the context of the technical solutions described herein.

The embodiments will be described with reference to FIGS. 1-7. It should be noted that, for the purpose of illustration, the components shown in the accompanying drawings may not exactly correspond to one another. In some views, certain components may be added or omitted for clarity of illustration.

Figure 2:
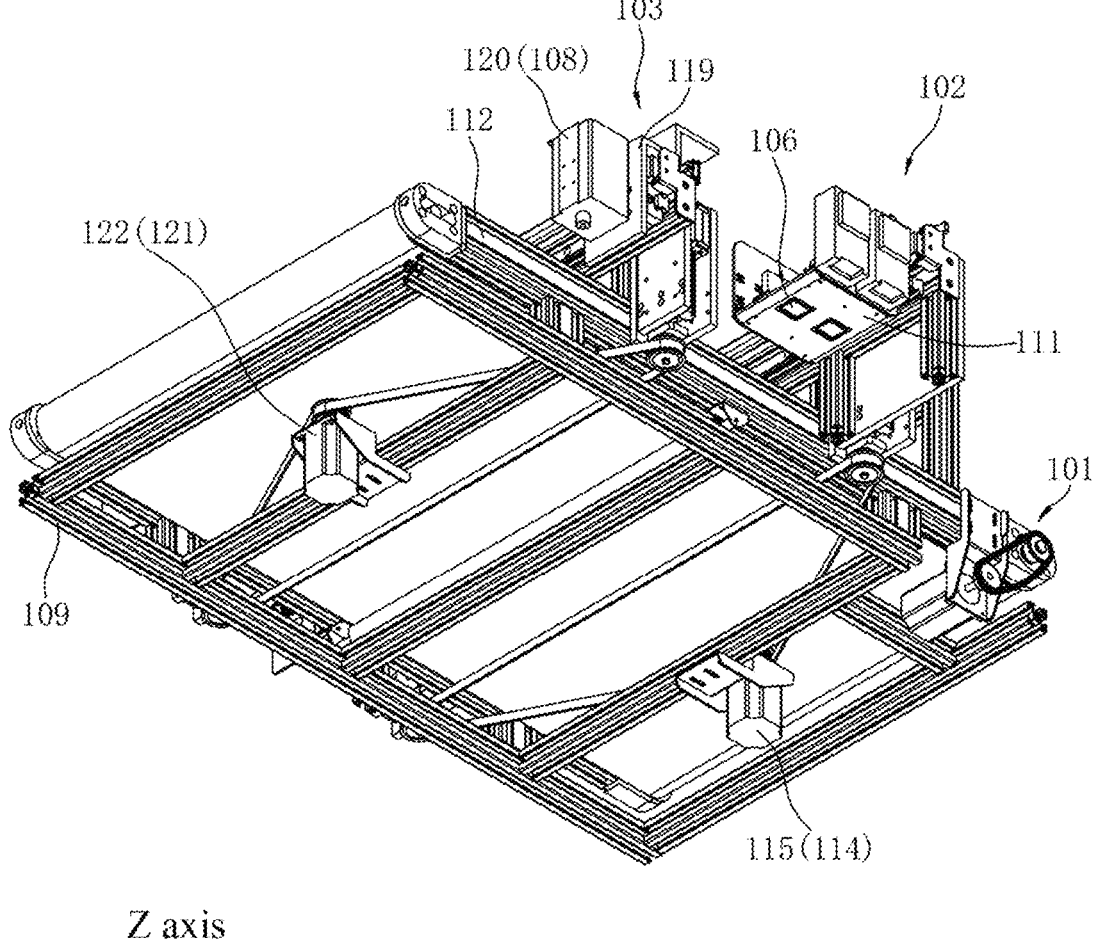
FIG. 2 is a bottom perspective view of the printer shown in FIG. 1.
Figure 3:
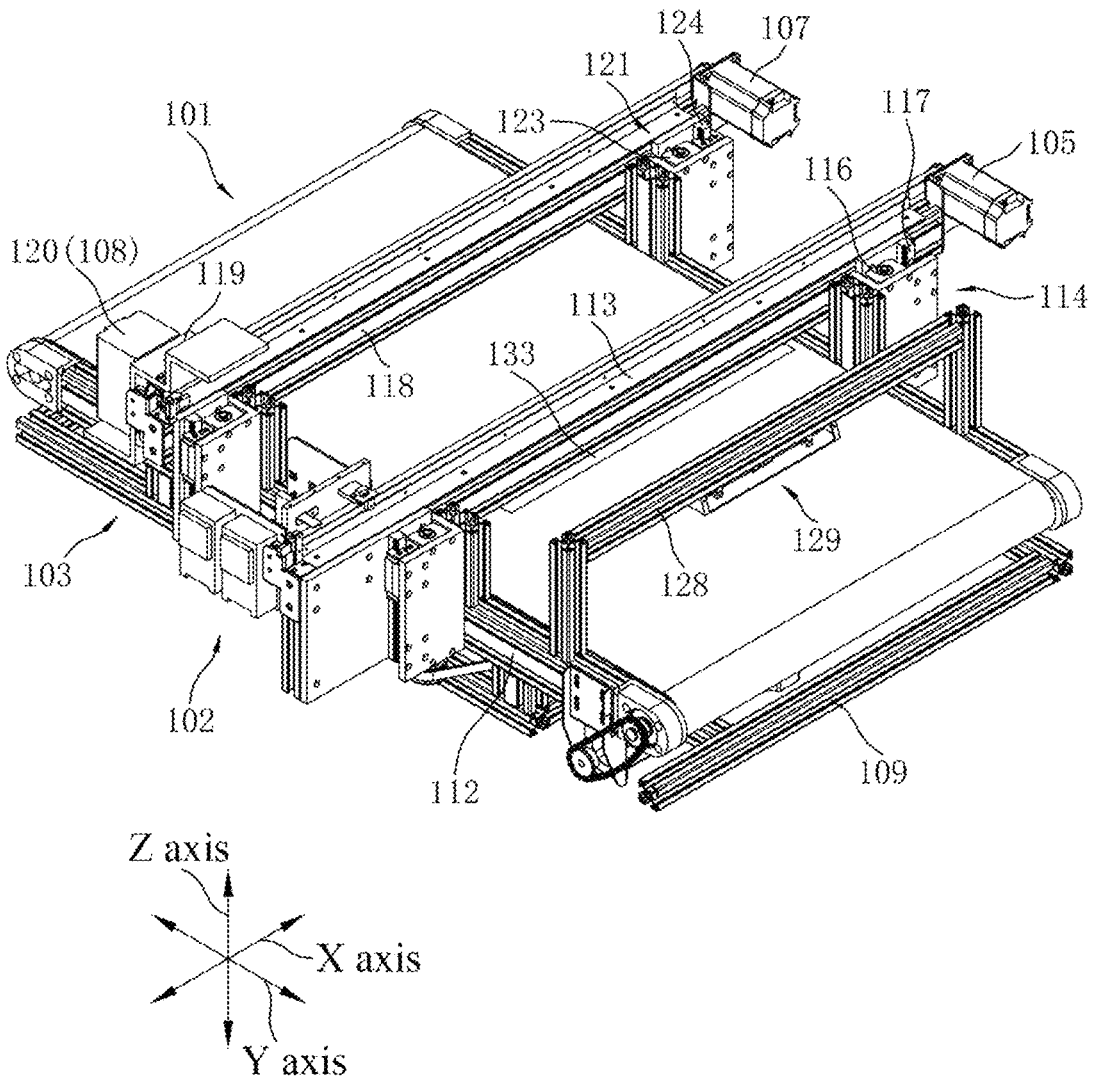
FIG. 3 is another perspective view of the printer shown in FIG. 1.

As shown in FIGS. 1-3, an embodiment of the present disclosure provides a printer, including a conveying member 101, a printing member 102 and a cutting member 103. The conveying member 101 is configured to convey a printing substrate 104 in a Y-axis direction. The printing member 102 includes a first driving mechanism 105 and a print head 106. The first driving mechanism 105 is provided above the conveying member 101, and is configured to drive the print head 106 to move in an X-axis direction. The print head 106 is provided above the conveying member 101, and is configured to be driven by the first driving mechanism 105 to move to perform printing on the printing substrate 104. The cutting member 103 includes a second driving mechanism 107 and a cutter 108. The second driving mechanism 107 is provided above the conveying member 101, and is configured to drive the cutter 108 to move in the X-axis direction. The cutter 108 is provided above the conveying member 101, and is configured to be driven by the second driving mechanism 107 to move to cut the printing substrate 104.

The printer provided herein is capable of automatically cutting the printing substrate 104. Specifically, the cutting member 103 that is independent from the printing member 102 is provided, and the second driving mechanism 107 is configured to drive the cutter 108 to move to automatically cut the printing substrate 104 in the X-axis direction. Furthermore, since the printing member 102 and the cutting member 103 use independent driving mechanisms, when the cutting member 103 cuts the substrate 104, the print head 106 of the printing member 102 can be reset to its initial position (for example, the print head 106 is positioned behind an ink pad 145, as described later), thereby suppressing contamination of the print head 106 caused by dust generated during cutting.

The substrate 104 may include, for example, materials compatible with various printers such as ultraviolet (UV) LED inkjet printers and direct-to-film (DTF) printers. Such substrates 104 may include: ordinary paper such as coated paper, matte coated paper and art paper; specialty paper such as synthetic paper, metallic paper and transparent paper; coated paper; adhesive-backed paper; magnetic paper; and thick cardboard. In addition, the substrate 104 is not limited to paper-based materials. The substrate 104 may also be made of plastic materials such as acrylic (polymethyl methacrylate, PMMA), polycarbonate (PC), acrylonitrile butadiene styrene (ABS), polyethylene terephthalate/glycol-modified polyethylene terephthalate (PET/PETG), polypropylene (PP), polyvinyl chloride (PVC), and polystyrene (PS); film materials; metal materials such as aluminum alloy and stainless steel; and wood-based materials. When the substrate 104 is paper, the paper may be conveyed continuously in the form of roll-fed sheet material, or it may be conveyed sheet by sheet by the conveying member 101.

The printer further includes a machine base 109, which may be, for example, a structure assembled using aluminum profiles. The conveying member 101 is configured to extend across the machine base 109 in the Y-axis direction. Additionally, the printer is provided with a printing platform 110, and the printing platform 110 is provided on the conveying member 101. The conveying member 101 includes a belt transmission mechanism configured to continuously convey the substrate in the Y-axis direction. The belt transmission mechanism includes a frame 112, which is assembled in a rectangular shape using the aluminum profiles. The frame 112 is mounted on the machine base 109 through aluminum profiles. The frame 112 is provided with a retaining plate (not shown in the figures), and the retaining plate is configured to hold the substrate 104. In some embodiments, a belt of the belt transmission mechanism is a flat belt having a width that substantially spans the frame 112 in the X-axis direction. The flat belt is provided with a plurality of first adsorption holes (not shown in the figures) arranged in a rectangular array. The plurality of first adsorption holes are configured to allow the substrate 104 (e.g., a film-like substrate) to be reliably held on the flat belt and prevent the film-like substrate from lifting or curling. In some embodiments, the belt transmission mechanism includes two synchronous belts for transmission, and the two synchronous belts are respectively provided on two sides of the frame 112 of the conveying member 101 in the X-axis direction.

In some embodiments, the machine base 109 is provided with an adsorption mechanism (not shown in the figures). The adsorption mechanism is configured to stably retain the substrate 104 on the conveying member 101 during printing or cutting when the substrate 104 is in a film-like form. The adsorption mechanism includes a blower. The adsorption mechanism is provided at a middle of the frame 112 of the conveying member 101 in the X-axis direction. In some embodiments, the blower is provided in plurality, and a plurality of blowers are provided on the retaining plate, and are positioned below the printing member 102 and/or the cutting member 103 in a Z-axis direction. When the belt of the belt transmission mechanism is the flat belt, the adsorption mechanism is positioned to face the plurality of first adsorption holes in the belt, such that the substrate 104 is adsorbed onto the belt via the first adsorption holes. In some embodiments, the retaining plate is provided with a plurality of second adsorption holes (not shown in the figures). The second adsorption holes are arranged in a rectangular array. When the belt of the belt transmission mechanism is the two synchronous belts, the substrate 104 is adsorbed onto the retaining plate via the second adsorption holes.

The printer includes a first gantry frame 113, which is mounted on the frame 112 of the conveying member 101 or on the machine base 109. The first driving mechanism 105 is mounted to the first gantry frame 113, and is configured to drive the print head 106 to move in the X-axis direction. In some embodiments, the first driving mechanism 105 is configured as a sliding table module that combines an X-axis driving motor, the belt transmission mechanism and a linear guide rail assembly extending in the X-axis direction. The first driving mechanism 105 is provided with a first mounting seat 111. The print head 106 is mounted on the first mounting seat 111. In some embodiments, the first mounting seat 111 is mounted on the linear guide rail assembly of the first driving mechanism 105, and is connected to the belt transmission mechanism, such that the first driving mechanism 105 is configured to drive the first mounting seat 111 to move in the X-axis direction, thereby driving the print head 106 to move in the X-axis direction. The print head 106 may be any known print head, for example, a print head used in UV LED inkjet printers or in DTF printers. It should be noted that the printing member 102 may include a plurality of print heads 106. The plurality of print heads 106 may be the same type or different types. The print heads 106 may be configured as UV LED inkjet print heads, DTF print heads, or a combination thereof.

Figure 6:
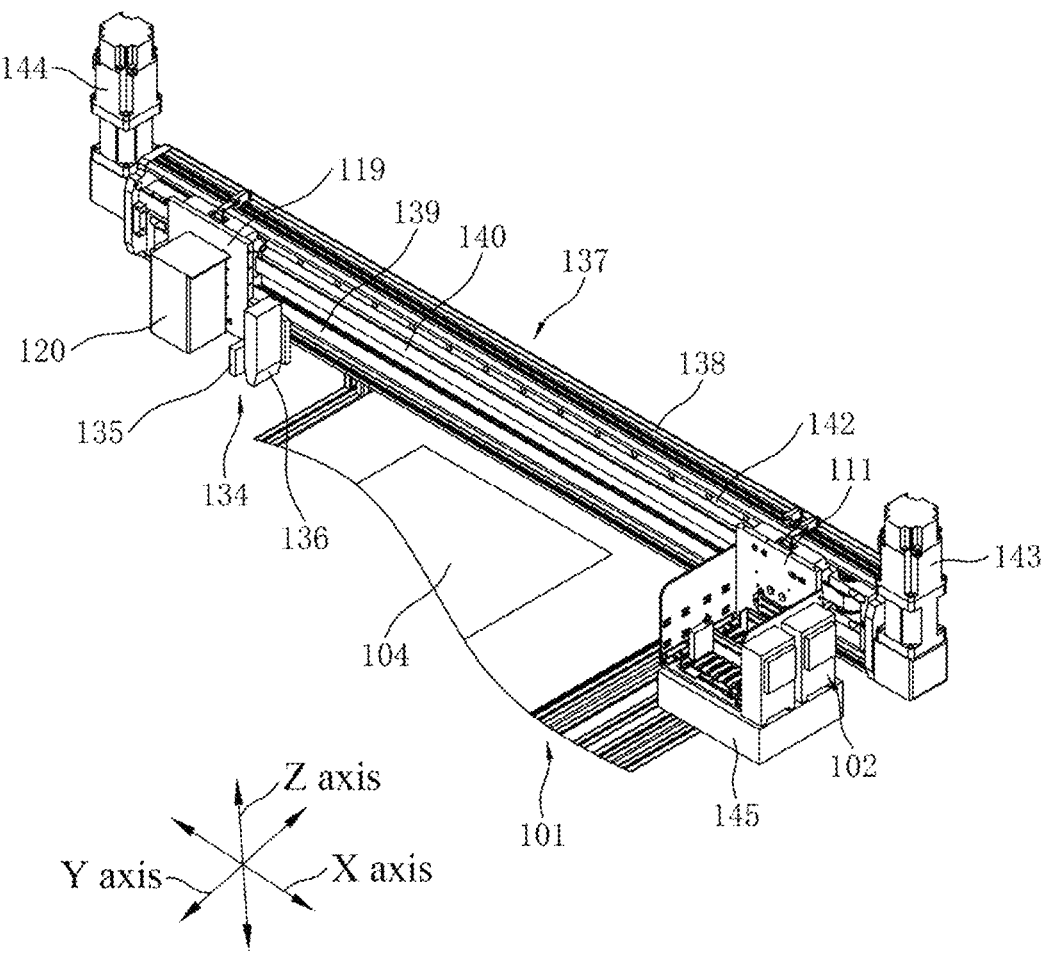
FIG. 6 is a perspective view of a main portion of the printer according to another embodiment of the present disclosure.

As shown in FIGS. 1 and 6, the ink pad 145 is provided at an end of the first gantry frame 113 in the X-axis direction. The ink pad 145 may be any ink pad known in the art, and is configured to prevent the print head 106 from being clogged by dust when the printer is in an initial or standby state. When the print head 106 is not in operation, the first driving mechanism 105 is configured to drive the print head 106 to move to a position above the ink pad 145, where the print head 106 is kept in a covered state by the ink pad 145.

In some embodiments, the printing member 102 further includes a third driving mechanism 114. In this configuration, the first driving mechanism 105 is mounted to the third driving mechanism 114 via the first gantry frame 113 (i.e., the first gantry frame 113 is mounted on the third driving mechanism 114). The third driving mechanism 114 is configured to drive the first driving mechanism 105 to move in the Z-axis direction, so as to drive the print head 106 to move in the Z-axis direction. In some embodiments, the third driving mechanism 114 includes a first Z-axis driving motor 115, two first lead-screw transmission assemblies 116 and two first Z-axis guiding members 117 (e.g., two linear guide rails). The first Z-axis driving motor 115 is provided below the conveying member 101. The two first lead-screw transmission assemblies 116 and the two first Z-axis guiding members 117 are respectively located at two ends of the conveying member 101 in the X-axis direction, and are mounted to the frame 112 of the conveying member 101. Each of the two first lead-screw transmission assemblies 116 is drivably connected to the first Z-axis driving motor 115. The first gantry frame 113 is mounted to the first Z-axis guiding members 117, and is connected to the two first lead-screw transmission assemblies 116. Accordingly, when the third driving mechanism 114 is actuated, the first gantry frame 113 and the first driving mechanism 105 mounted thereon are driven integrally to move in the Z-axis direction.

In some embodiments, the cutting member 103 and the printing member 102 are arranged spaced apart in the Y-axis direction. In some embodiments, the cutting member 103 is provided on either side of the printing member 102 in the Y-axis direction as needed. In some embodiments, the printer further includes a second gantry frame 118, which is mounted on the frame 112 of the conveying member 101 or on the machine base 109. The second driving mechanism 107 is mounted to the second gantry frame 118, and is configured to drive in the X-axis direction. In some embodiments, the second driving mechanism 107 is a sliding table module including an X-axis driving motor, a belt transmission mechanism and a linear guide rail assembly extending in the X-axis direction. The second driving mechanism 107 is provided with a second mounting seat 119. A cutter 108 is mounted on the second mounting seat 119. In some embodiments, the second mounting seat 119 is provided on the linear guide rail assembly of the second driving mechanism 107, and is connected to the belt transmission mechanism, such that the second driving mechanism 107 is configured to drive the second mounting seat 119 to move in the X-axis direction, thereby driving the cutter 108 to move in the X-axis direction.

In some embodiments, the cutter 108 includes a laser 120, which is mounted on the second mounting seat 119. Although a power of the laser 120 is not particularly limited as long as it is capable of cutting the substrate 104 made of paper material, an engraving laser is selected to reduce the installation space required for the laser 120. In some embodiments, the power of the laser 120 is preferably below 50 W. The laser 120 has any of the following power ratings: 50 W, 40 W, 30 W, 20 W, 15 W, 10 W, 8 W, 5 W, 4 W, 1.6 W, 1 W, or 500 mW. In some embodiments, to allow cutting of plastic sheets such as acrylic or thin metal sheets, the laser 120 has a power greater than or equal to 8 W and less than or equal to 50 W, optionally greater than or equal to 8 W and less than or equal to 40 W, or greater than or equal to 8 W and less than or equal to 20 W.

The use of the engraving laser allows it to function not only as the cutter 108, but also be used for engraving if necessary.

In some embodiments, the cutting member 103 further includes a fourth driving mechanism 121. In this configuration, the second driving mechanism 107 is mounted to the fourth driving mechanism 121 via the second gantry frame 118 (i.e., the second gantry frame 118 is provided on the fourth driving mechanism 121). The fourth driving mechanism 121 is configured to drive the second driving mechanism 107 to move in the Z-axis direction, so as to drive the cutter 108 to move in the Z-axis direction. In some embodiments, the fourth driving mechanism 121 includes a second Z-axis driving motor 122, two second lead-screw transmission assemblies 123 and two second Z-axis guiding members 124 (e.g., linear guide rails). The second Z-axis driving motor 122 is provided below the conveying member 101. The two second lead-screw transmission assemblies 123 and the two second Z-axis guiding members 124 are respectively positioned at the two ends of the conveying member 101 in the X-axis direction, and are mounted to the frame 112 of the conveying member 101. The two second lead-screw transmission assemblies 123 are drivably connected to the second Z-axis driving motor 122, respectively. The second gantry frame 118 is mounted to the second Z-axis guiding members 124, and is connected to the two second lead-screw transmission assemblies 123. Accordingly, when the fourth driving mechanism 121 performs driving in the Z-axis direction, the second gantry frame 118 and the second driving mechanism 107 mounted on second gantry frame 118 are driven integrally in the Z-axis direction.

Figure 7:
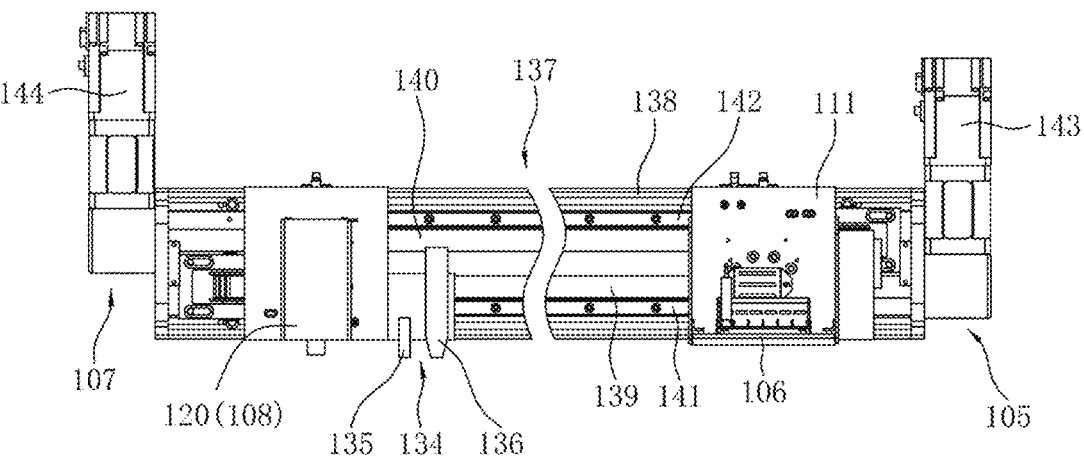
FIG. 7 is a front view of the main portion shown in FIG. 6.
Figure 7:
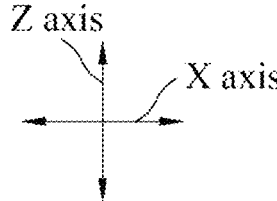

In some embodiments, as shown in FIGS. 6-7, the printer further includes a cleaning member 134 configured to clean a surface of the substrate 104. In some embodiments, the cleaning member 134 is configured to clean the surface of the substrate 104 prior to printing by the printing member 102, thereby improving the cleanliness of the surface of the substrate 104, enhancing ink adhesion and improving printing quality. In some embodiments, the cleaning member 134 includes a cleaning brush 135, a vacuum dust collector 136 or a combination thereof. In some embodiments, the cleaning brush 135, the vacuum dust collector 136 or a combination thereof may be implemented using commercially-available components. In some embodiments, the cleaning brush 135, the vacuum dust collector 136 or a combination thereof may be mounted to the second mounting seat 119. The second driving mechanism 107 is configured to drive the cleaning brush 135, the vacuum dust collector 136 or a combination thereof to perform cleaning on the surface of the substrate 104. The cleaning member 134 may be selectively activated depending on the actual process requirements. For example, in a process where cutting is performed before printing, the cleaning member 134 may operate in coordination with the cutting operation of the laser 120 to clean the surface of the substrate 104 during the cutting process. In a process where printing is performed before cutting, the cleaning member 134 may clean the surface of the substrate 104 prior to printing, and after printing and subsequent cutting are completed, the cleaning member 134 may clean again the surface of the substrate 104 to reduce the adherence of cutting-generated dust or debris to the surface.

Figure 4:
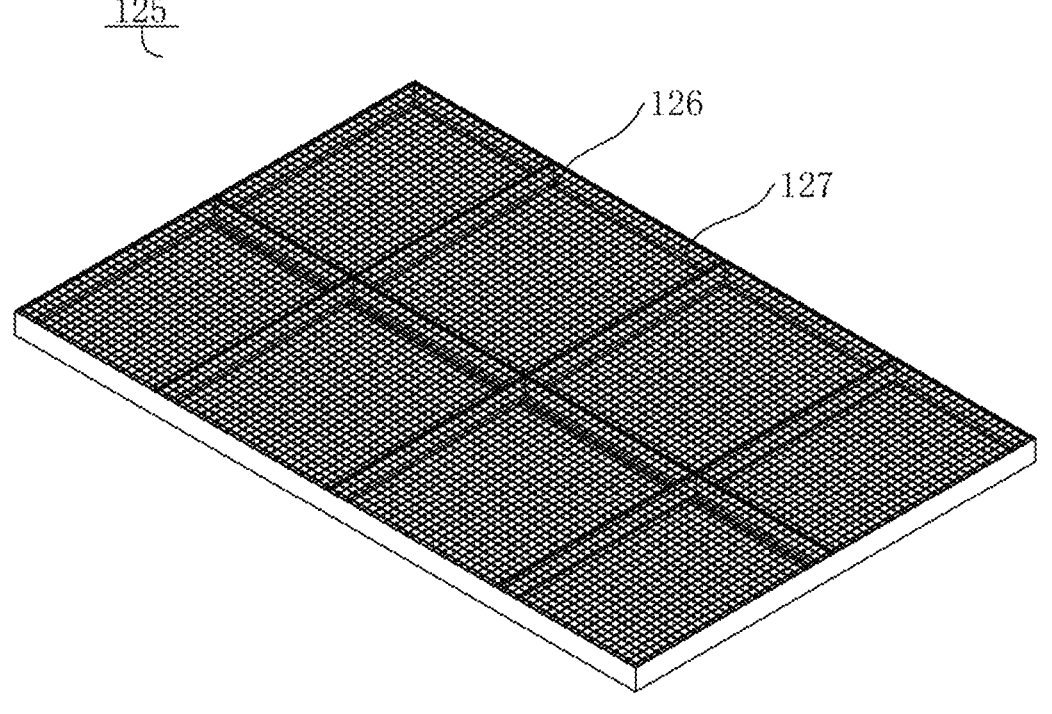
FIG. 4 is a perspective view of a retaining frame of the printer according to an embodiment of the present disclosure.
Figure 4:
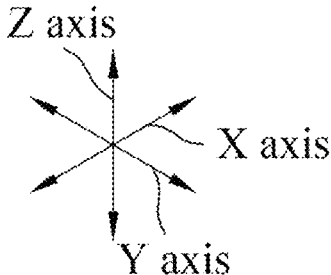

Referring also to FIG. 4, the printer further includes a retaining frame 125 configured to hold the substrate 104. The retaining frame 125 is detachably mounted on the conveying member 101. In some embodiments, the retaining frame 125 is a component formed of a metal material such as stainless steel, with a mesh structure retaining portion 126 formed on its surface. The retaining portion 126 is configured to hold the substrate 104. In some embodiments, a middle of the retaining frame 125 is provided with a cavity 127. The retaining portion 126 is configured to cover the cavity 127. In some embodiments, the retaining frame 125 is provided on a belt of the conveying member 101, or is detachably fixed to the belt of the conveying member 101 via various fastening structures such as screws or clasps. By using such the retaining frame 125, it is possible to prevent laser light emitted from the laser 120 from directly reaching the belt of the conveying member 101, thereby avoiding damage to the belt or other components of the conveying member 101.

Figure 5:
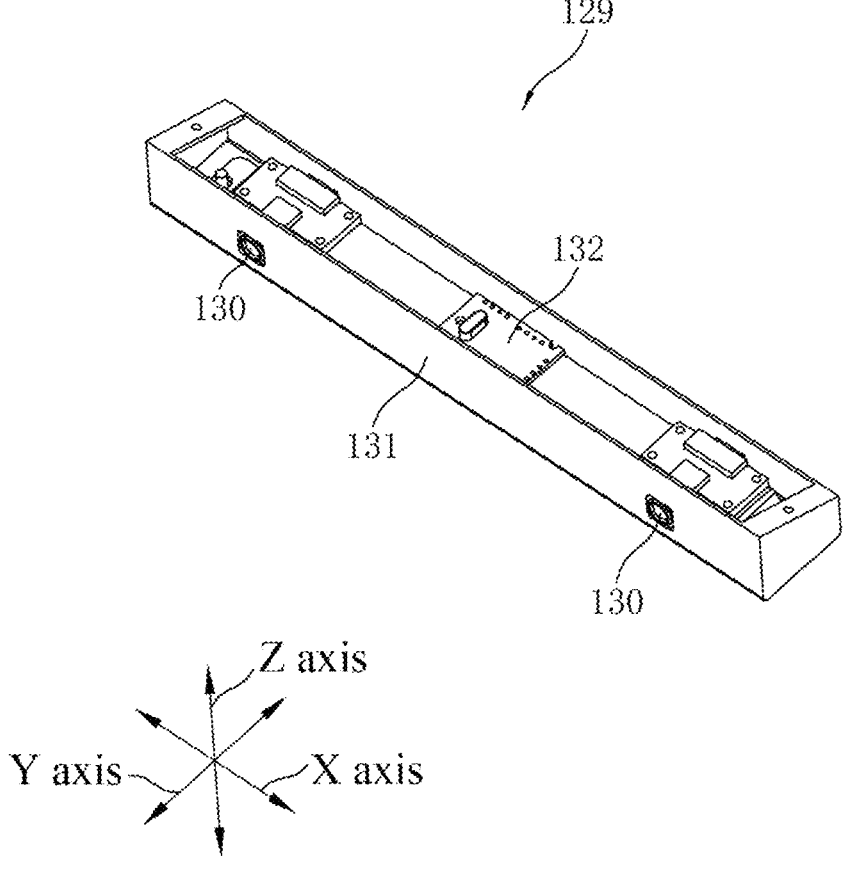
FIG. 5 schematically shows a detection member of the printer shown in FIG. 3.

Referring also to FIG. 5, in order to determine a cutting path of a to-be-cut substrate 104 by the cutter 108, the printer further includes a detection member 129 configured to detect a trajectory of an image printed on the substrate 104. The detection member 129 is provided above the conveying member 101. The detection member 129 and the printing member 102 are arranged spaced apart in the Y-axis direction. In some embodiments, the frame 112 of the conveying member 101 is provided with a third gantry frame 128. The detection member 129 is mounted to the third gantry frame 128, and is located at a middle of the third gantry frame 128 in the X-axis direction. In some embodiments, the detection member 129 includes a camera 130, as long as it is capable of covering the image on the printing substrate 104. The number of cameras 130 is not particularly limited and may be one or more. In some embodiments, the camera 130 is a complementary metal-oxide-semiconductor (CMOS) image sensor with a resolution of 5 megapixels or higher. In some embodiments, the camera 130 is provided in plurality, the captured images are synthesized using conventional, known techniques to determine the desired cutting path of the image, and then the second driving mechanism 107 drives the cutter 108 based on the path to cut the substrate 104. The detection member 129 includes a housing 131. A plurality of cameras 130 are arranged spaced apart in the X-axis direction, and are embedded within the housing 131. In some embodiments, a controller 132 for the cameras 130 is accommodated within the housing 131, such that the cameras 130 can be installed as an integrated unit.

Referring to FIG. 5, the detection member 129 further includes a scanner 133. In some embodiments, the scanner 133 is configured to extend in the X-axis direction, and scan an area that covers the entire image on the substrate 104 in the X-axis direction. In some embodiments, the detection member 129 includes the camera 130, the scanner 133, or a combination thereof.

The printer is capable of automatically cutting the printing substrate 104. Specifically, the cutting member 103 that is independent from the printing member 102 is provided, and the second driving mechanism 107 is configured to drive the cutter 108 to move to automatically cut the substrate 104 in the X-axis direction. Furthermore, since the printing member 102 and the cutting member 103 are driven by separate driving mechanisms, the print head 106 of the printing member 102 can be returned to its initial position (e.g., a position covered by the ink pad 145) when the cutting member 103 performs the cutting operation. This helps prevent the print head 106 from being contaminated by dust or debris generated during the cutting process.

In addition, by using the engraving laser with a power of greater than or equal to 8 W and less than or equal to 50 W, an overall size of the laser 120 can be kept relatively small while enabling the cutting of a wider variety of substrate materials. For example, in addition to various types of paper, the laser 120 can also cut rigid and hard flat materials such as plastic sheets, wooden boards and metal plates. Accordingly, the range of materials that can be cut by the printer is expanded without increasing the overall structure of the printer. In particular, by using the laser 120 with the power of greater than or equal to 8 W and less than or equal to 50 W as the cutter 108, substrates 104 that are difficult to manually cut by an operator can be cut with ease, thereby improving the cutting efficiency and cutting precision.

In an embodiment, the printer is a UV LED inkjet printer configured to perform UV printing on an acrylic plate used as the substrate 104. Specifically, after an image is printed on the substrate 104 by the print head 106, the actual printed image pattern is detected by the detection member 129, and the laser 120 of the cutting member 103 performs cutting based on the detected image pattern. Since the laser 120 has a power of greater than or equal to 8 W and less than or equal to 50 W, the acrylic plate can be smoothly and efficiently cut.

However, the present disclosure is not limited thereto. In some embodiments, the acrylic plate serving as the substrate 104 is cut before printing. That is, the cutting member 103 performs cutting based on an image pattern that is pre-stored in the system of the UV LED inkjet printer. Then, after the cutting is completed, printing is performed. Since cutting with the laser 120 causes the edges of the contour of the substrate 104 to become scorched or blackened, performing the printing after the cutting allows the ink to cover such potentially darkened edge portions, thereby improving the overall printing quality.

Furthermore, by using the engraving laser, image engraving is also performed on the substrate 104. In addition, the engraving laser can be used to roughen the surface of the substrate 104, thereby increasing surface friction and enhancing ink adhesion during printing, without requiring any additional pretreatment of the substrate 104.

Regarding the printer disclosed herein, by providing the retaining frame 125 for holding the printing substrate 104, it is possible to prevent the laser 120 from directly damaging the conveying member 101 or other components. Furthermore, by configuring the retaining frame 125 to include the retaining portion 126 having a mesh structure and the cavity 127, potential damage to the retaining frame 125 by the laser 120 can also be reduced.

Regarding the printer disclosed herein, the detection member 129 is configured to detect the image trajectory of the printing substrate 104, the substrate 104 can be cut more accurately according to the actual required cutting trajectory.

Regarding the printer disclosed herein, using CMOS image camera as the detection member 129 can suppress increases in the printer's cost.

Regarding the printer disclosed herein, by means of the third driving mechanism 114 and the fourth driving mechanism 121, the printer can accommodate substrates 104 of various thicknesses and suitably adjust the cutting distance of the cutter 108. Accordingly, printing and cutting on the substrate 104 can be performed at appropriate distances.

In this embodiment, although an example is given where the laser 120 has a power of less than or equal to 50 W, the present disclosure is not limited thereto. The power of the laser 120 can be increased when sufficient installation space is available.

In this embodiment, although an example is described where the conveying member 101 is the belt transmission mechanism, the present disclosure is not limited thereto. In some embodiments, the conveying member 101 has a structure similar to the sliding table module substantially similar to the first driving mechanism 105 and the second driving mechanism 107. In some embodiments, the conveying member 101 includes a flat chain transmission mechanism.

In this embodiment, although an example is described in which the cutter 108 uses the laser 120, the present disclosure is not limited thereto. In some embodiments, the cutter 108 is a blade (not shown in the figures), which is rotatably mounted on the second mounting seat 119 in a manner rotatable within a plane defined by the X-axis and Z-axis. In some embodiments, the blade is a disk-shaped blade freely rotatably supported on the second mounting seat 119 via a support shaft. The blade is driven by a motor.

In this embodiment, although the first driving mechanism 105 is described as being mounted to the first gantry frame 113, and the second driving mechanism 107 as being mounted to the second gantry frame 118, the configuration is not limited thereto. In some embodiments, the first driving mechanism 105 and the second driving mechanism 107 are configured such that the print head 106 and the cutter 108 move side-by-side in the X-axis direction, provided that the print head 106 is maintained in a shielded position when the cutter 108 is performing cutting on the substrate 104.

In some embodiments, the first driving mechanism 105 and the second driving mechanism 107 are integrated into a modular structure 137 that includes two independently operable driving mechanisms. The modular structure 137 includes a base 138. The base 138 is provided with a first transmission member 139 and a second transmission member 140 (e.g., belt transmission mechanisms), as well as a first guiding member 141 and a second guiding member 142

(e.g., linear guide rails). The first transmission member 139 is parallel to the second transmission member 140, and the first guiding member 141 is parallel to the second guiding member 142. Two ends of the base 138 are provided with a first driving motor 143 and a second driving motor 144, respectively. The first driving motor 143 is connected to the first transmission member 139, and the second driving motor 144 is connected to the second transmission member 140. When linear guide rails are used as the first guiding member 141 and the second guiding member 142, linear sliders of the first guiding member 141 and the second guiding member 142 are arranged side by side in an extension direction of the base 138.

In the modular structure 137, the first driving motor 143, the first transmission member 139, and the first guiding member 141 constitute the first driving mechanism 105. The print head 106 is mounted to the first guiding member 141 via the first mounting seat 111. Similarly, the second driving motor 144, the second transmission member 140, and the second guiding member 142 constitute the second driving mechanism 107. The cutter 108 is mounted to the second guiding member 142 via the second mounting seat 119. Accordingly, the modular structure 137 integrates the first driving mechanism 105 and the second driving mechanism 107, which are independent of each other, and the print head 106 and the cutter 108 are arrange side by side in the length direction of the base 138. It should be noted that the separate listing of the first guiding member 141 and the second guiding member 142 is for illustrative purposes only. In practice, the first guiding member 141 and the second guiding member 142 may be combined. For example, when linear guide rails are used as the first guiding member 141 and the second guiding member 142, the print head 106 and the cutter 108 are mounted on different sliders that run along a common guide rail.

In some embodiments, the modular structure 137 are mounted to the first gantry frame 113 in the X-axis direction, such that an end of the modular structure 137 mounting the first driving motor 143 is opposite to an end of the first gantry frame 113 mounting the ink pad 145. During printer operation, when the print head 106 performs printing on the substrate 104, the second driving mechanism 107 of the modular structure 137 drives the cutter 108 to move to a position avoiding the printing path of the print head 106, thereby preventing interference between the cutter 108 and the print head 106. When the cutter 108 performs cutting on the substrate 104, the first driving mechanism 105 drives the print head 106 to move to a position covered by the ink pad 145 (i.e., the initial position).

In some embodiments, the print head 106 and the cutter 108 are arranged side by side in the X-axis direction, allowing the print head 106 and the cutter 108 to be installed without increasing the overall size of the printer in the Y-axis direction. As a result, the printer can be applied in a wider range of scenarios.

In some embodiments, the first driving mechanism 105 and the second driving mechanism 107 are respectively mounted on the first gantry frame 113. Specifically, for example, the first driving mechanism 105 is mounted on a first side of the first gantry frame 113 in the Y-axis direction, while the second driving mechanism 107 is mounted on a second side of the first gantry frame 113 in the Y-axis direction. In this manner, the second gantry frame 118 can be omitted, enabling the printing member 102 and the cutting member 103 to operate independently, and to some extent suppressing an increase in the overall size of the printer in the Y-axis direction. As a result, the printer can be applied in a wider range of scenarios.

In some embodiments, although the detection member 129 is described as being mounted on the third gantry frame 128, the present disclosure is not limited thereto. The detection member 129 can be installed at any desired position. For example, the detection member 129 can also be mounted on the first gantry frame 113.

In this embodiment, although the conveying member 101 is described as being fixedly provided to the machine base 109, and the printing member 102 and the cutting member 103 are configured to move up and down in the Z-axis direction, this arrangement is not limiting. In some embodiments, the printing member 102 and the cutting member 103 are fixedly provided to the machine base 109, respectively, while the conveying member 101 is configured to move up and down in the Z-axis direction. In some embodiments, the printer further includes a fifth driving mechanism (not shown in the figures), which is mounted on the machine base 109. The conveying member 101 is mounted on the fifth driving mechanism. The fifth driving mechanism is configured to drive the conveying member 101 to move close to or away from the printing member 102 and the cutting member 103 in the Z-axis direction. In this arrangement, the fifth driving mechanism can be configured with a structure similar to the third driving mechanism 114 (or the fourth driving mechanism 121).

In this embodiment, although the printer including the detection member 129 is described, the present disclosure is not limited thereto. The cutting trajectory may be preset together with the printing trajectory in the printing image in advance, such that there is no need to perform detection again after printing is completed.

Described embodiments are merely illustrative, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A printer, comprising:
a conveying member;
a printing member;
a cutting member; and
a base mounted to the conveying member;
wherein the conveying member is configured to convey a printing substrate in a Y-axis direction;
the printing member comprises a first driving mechanism and a print head; the first driving mechanism is provided above the conveying member, and is configured to drive the print head to move in an X-axis direction; and the print head is provided above the conveying member, and is configured to be driven by the first driving mechanism to move to perform printing on the printing substrate;
the cutting member comprises a second driving mechanism and a cutter; the second driving mechanism is provided above the conveying member, and is configured to drive the cutter to move in the X-axis direction; and the cutter is provided above the conveying member, and is configured to be driven by the second driving mechanism to move to cut the printing substrate;
the first driving mechanism comprises a first driving motor, a first transmission member, and a first guiding member, the second driving mechanism comprises a second driving motor, a second transmission member, and a second guiding member, the first transmission member and the second transmission member are arranged side by side and in parallel on the base, and the first guiding member and the second guiding member are arranged side by side and in parallel on the base; the first transmission member, the second transmission member, the first guiding member, and the second guiding member are spaced apart from one another in a direction perpendicular to the X-axis direction; and the first driving motor and the second driving motor are respectively arranged on two opposite ends of the base in a length direction of the base, the first driving motor is configured to drive the print head to move along the first guiding member via the first transmission member, and the second driving motor is configured to drive the cutter to move along the second guiding member via the second transmission member.

2. The printer according to claim 1, wherein the cutter is a laser.

3. The printer according to claim 2, wherein the laser has a power of greater than or equal to 8 W and less than or equal to 50 W.

4. The printer according to claim 2, wherein the laser is an engraving laser.

5. The printer according to claim 1, wherein the first driving mechanism and the second driving mechanism are configured such that the print head and the cutter move side by side in the X-axis direction; and
   the print head is in a shielded position in response to a case that the cutter performs cutting on the printing substrate.

6. The printer according to claim 1, further comprising:
   a retaining frame;
   wherein the retaining frame is configured to hold the printing substrate, and is detachably mounted on the conveying member; and the retaining frame is configured to be carried by the conveying member.

7. The printer according to claim 6, wherein the retaining frame is provided with a retaining portion having a mesh structure; and the retaining portion is configured to hold the printing substrate.

8. The printer according to claim 1, further comprising:
   a third driving mechanism;
   wherein the conveying member is mounted on the third driving mechanism; and
   the third driving mechanism is configured to drive the conveying member to move toward or away from the printing member and the cutting member in a Z-axis direction.

9. The printer according to claim 1, wherein the printing member further comprises a third driving mechanism;

the print head is mounted to the first driving mechanism;
the first driving mechanism is mounted to the third driving mechanism; and
the third driving mechanism is configured to drive the first driving mechanism to move in a Z-axis direction, so as to drive the print head to move in the Z-axis direction.

10. The printer according to claim 1, wherein the cutting member further comprises a third driving mechanism;
   the cutter is mounted to the second driving mechanism;
   the second driving mechanism is mounted to the third driving mechanism; and
   the third driving mechanism is configured to drive the second driving mechanism to move in a Z-axis direction, so as to drive the cutter to move in the Z-axis direction.

11. The printer according to claim 1, further comprising:
   a detection member;
   wherein the detection member is provided above the conveying member, and is spaced apart from the printing member in the Y-axis direction; and
   the detection member comprises a camera, a scanner or a combination thereof.

12. The printer according to claim 1, further comprising:
   a cleaning member;
   wherein the cleaning member is configured to clean a surface of the printing substrate.

13. The printer according to claim 12, wherein the cleaning member comprises a cleaning brush, a vacuum dust collector or a combination thereof.

14. The printer according to claim 1, wherein the printing substrate is a plastic plate, a wooden plate or a metal plate.

15. The printer according to claim 1, wherein each of a length of the first transmission member in the X-axis direction, a length of the second transmission member in X-axis direction, a length of the first guiding member in the X-axis direction, and a length of the second guiding member in the X-axis direction is greater than a length of the conveying member in the X-axis direction.

16. The printer according to claim 1, wherein
   in a case where the print head performs printing on the printing substrate, the second driving mechanism is configured to drive the cutter to move to a position avoiding a printing path of the print head, thereby preventing interference between the cutter and the print head; and
   in a case where the cutter performs cutting on the printing substrate, the first driving mechanism is configured to drive the print head to move to a position covered by an ink pad.

* * * * *